US012614553B2

(12) United States Patent
Dong et al.

(10) Patent No.: US 12,614,553 B2
(45) Date of Patent: Apr. 28, 2026

(54) METHOD, APPARATUS, ELECTRONIC DEVICE, AND MEDIUM FOR SPEECH PROCESSING

(71) Applicant: Beijing Youzhuju Network Technology Co., Ltd., Beijing (CN)

(72) Inventors: Linhao Dong, Beijing (CN); Zhenlin Liang, Beijing (CN); Zhiyun Fan, Beijing (CN); Yi Liu, Beijing (CN); Zejun Ma, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 259 days.

(21) Appl. No.: 18/365,765

(22) Filed: Aug. 4, 2023

(65) Prior Publication Data

US 2024/0046921 A1      Feb. 8, 2024

(30) Foreign Application Priority Data

Aug. 5, 2022     (CN) .......................... 202210939799.5

(51) Int. Cl.
*G10L 17/02*          (2013.01)
*G10L 15/18*          (2013.01)
(Continued)

(52) U.S. Cl.
CPC .......... *G10L 17/18* (2013.01); *G10L 15/1815* (2013.01); *G10L 15/183* (2013.01); *G10L 17/00* (2013.01); *G10L 17/06* (2013.01)

(58) Field of Classification Search
None
See application file for complete search history.

(56) References Cited

U.S. PATENT DOCUMENTS 8,332,223 B2 * 12/2012 Farrell .................... G10L 17/00
                                                        704/246
12,039,981 B2 * 7/2024 Dong ...................... G10L 17/06
                        (Continued)

FOREIGN PATENT DOCUMENTS

CN          1547191 A      11/2004
CN       111312216 A       6/2020
                    (Continued)

OTHER PUBLICATIONS

India Massana, Miquel Angel, José Adrián Rodríguez Fonollosa, and Francisco Javier Hernando Pericas. "LSTM neural network-based speaker segmentation using acoustic and language modelling." INTERSPEECH 2017: Aug. 20-24, 2017: Stockholm. International Speech Communication Association (ISCA), 2017. (Year: 2017).*

(Continued)

*Primary Examiner* — Douglas Godbold
(74) *Attorney, Agent, or Firm* — Astute IP Law Group

(57)          ABSTRACT

Embodiments of the present disclosure provide a method, apparatus, electronic device, and medium for speech processing. The method comprises generating a token-level semantic feature of target speech data based on a frame-level acoustic feature of the target speech data. The method further comprises generating a token-level voiceprint feature of the target speech data based on the frame-level acoustic feature. The method further comprises determining a token in the target speech data where speaker change occurs based on the token-level semantic feature and the token-level voiceprint feature. According to embodiments of the present disclosure, speaker change in speech data is detected at the token level in conjunction with the speaker's acoustic features and speech contents, and speaker-based speech recog- (Continued)

nition results are output directly without post-processing, simplifying the speech recognition process.

18 Claims, 7 Drawing Sheets

(51) Int. Cl.

| | |
|---|---|
| *G10L 15/183* | (2013.01) |
| *G10L 17/00* | (2013.01) |
| *G10L 17/06* | (2013.01) |
| *G10L 17/18* | (2013.01) |

(56) References Cited

U.S. PATENT DOCUMENTS

| | | | |
|---|---|---|---|
| 2010/0106502 A1 | 4/2010 | Farrell et al. | |
| 2014/0142940 A1* | 5/2014 | Ziv | G10L 17/02 |
| | | | 704/235 |
| 2015/0025887 A1* | 1/2015 | Sidi | G10L 17/02 |
| | | | 704/245 |
| 2020/0211544 A1* | 7/2020 | Mikhailov | G10L 15/16 |
| 2022/0028376 A1 | 1/2022 | Wu et al. | |
| 2022/0254351 A1* | 8/2022 | Jung | G10L 17/22 |
| 2023/0042310 A1* | 2/2023 | Wexler | G06F 1/3278 |
| 2023/0089308 A1* | 3/2023 | Wang | G10L 15/063 |
| | | | 704/232 |
| 2023/0115271 A1* | 4/2023 | Wang | G10L 25/87 |
| | | | 704/200 |
| 2024/0005941 A1* | 1/2024 | Xu | G10L 25/30 |
| 2024/0029709 A1* | 1/2024 | Cai | G10L 15/26 |
| 2025/0118298 A1* | 4/2025 | Muntasir | H04M 3/4936 |

FOREIGN PATENT DOCUMENTS

| | | |
|---|---|---|
| CN | 111785284 A | 10/2020 |
| CN | 112668343 A | 4/2021 |
| CN | 113327599 A | 8/2021 |
| CN | 113936643 A | 1/2022 |
| CN | 114360574 A | 4/2022 |
| CN | 115273862 B | 6/2025 |

OTHER PUBLICATIONS

Park, Tae Jin, et al. "Speaker diarization with lexical information." arXiv preprint arXiv:2004.06756 (2020). (Year: 2020).*

Dong, Linhao, and Bo Xu. "Cif: Continuous integrate-and-fire for end-to-end speech recognition." ICASSP 2020-2020 IEEE International Conference on Acoustics, Speech and Signal Processing (ICASSP). IEEE, 2020. (Year: 2020).*

Chang, Xuankai, et al. "End-to-end multi-speaker speech recognition with transformer." ICASSP 2020-2020 IEEE International Conference on Acoustics, Speech and Signal Processing (ICASSP). IEEE, 2020. (Year: 2020).*

Anidjar, Or Haim, et al. "Hybrid speech and text analysis methods for speaker change detection." IEEE/ACM Transactions on Audio , Speech, and Language Processing 29 (2021): 2324-2338. (Year: 2021).*

First Office Action for Chinese Patent Application No. 202210939799. 5, mailed Oct. 22, 2024, 16 pages.

* cited by examiner

300

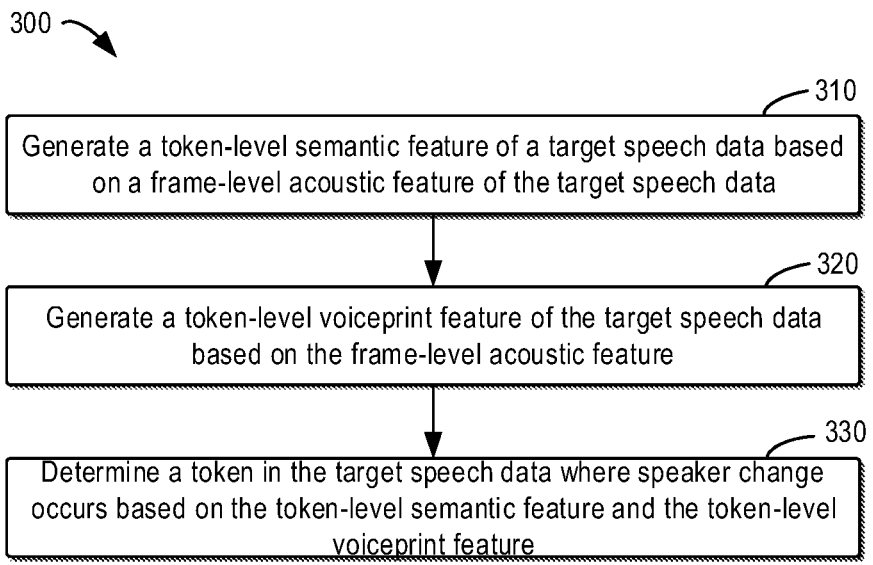

310

Generate a token-level semantic feature of a target speech data based on a frame-level acoustic feature of the target speech data

320

Generate a token-level voiceprint feature of the target speech data based on the frame-level acoustic feature

330

Determine a token in the target speech data where speaker change occurs based on the token-level semantic feature and the token-level voiceprint feature

Semantic feature
generation unit — 710

Voiceprint feature
generation unit — 720

Detection unit — 730

800

CPU/GPU — 801          ROM — 802          RAM — 803

— 804

— 805

I/O interface

Input unit — 806          Output unit — 807          Storage unit — 808          Communica tion unit — 809

1

METHOD, APPARATUS, ELECTRONIC DEVICE, AND MEDIUM FOR SPEECH PROCESSING

CROSS-REFERENCE TO RELATED APPLICATION

This application claims priority to CN Application No. 202210939799.5, entitled METHOD, APPARATUS, ELECTRONIC DEVICE, AND MEDIUM FOR SPEECH PROCESSING, filed on Aug. 5, 2022, the entire contents of that application being incorporated herein by reference in its entirety.

FIELD

Embodiments of the present disclosure generally relate to the field of speech processing, and more specifically, to method, apparatus, electronic device, computer-readable storage medium and computer program products for speech processing.

BACKGROUND

With the rapid development of Internet and Artificial Intelligence (AI) technology, Automatic Speech Recognition (ASR) has brought great convenience to people's life. In some scenarios (e.g., teleconferencing, distance learning), there is a need to collect and collate speech content, hoping that speech recognition will be done according to speaker role. However, multiple people may speak alternately or simultaneously, which brings challenges to speech recognition.

Speaker Change Detection (SCD) aims at locating the time when different speakers begin to speak, and a SCD system is often used as sub-modules for speaker segmentation clustering or as a front-end for speech recognition tasks to cut up long speech. The performance of the SCD system will greatly affect the subsequent processing tasks.

SUMMARY

In view of the foregoing, embodiments of the present disclosure provide solutions to speech processing.

According to a first aspect of the present disclosure, there is provided a method of speech processing. The method comprises: generating a token-level semantic feature of target speech data based on a frame-level acoustic feature of the target speech data; generating a token-level voiceprint feature of the target speech data based on the frame-level acoustic feature; and determining a token in the target speech data where speaker change occurs based on the token-level semantic feature and the token-level voiceprint feature.

According to embodiments of the present disclosure, speaker change in speech data is detected at the token level in conjunction with the speaker's acoustic features and speech content, and speaker-based speech recognition results can be output directly without post-processing, simplifying the speech recognition process.

In a second aspect of the present disclosure, there is provided an apparatus for speech processing. The apparatus comprises: a semantic feature generation unit, a voiceprint feature generation unit, and a detection unit. The semantic feature generation unit is configured to generate a token-level semantic feature of target speech data based on a frame-level acoustic feature of the target speech data. The voiceprint feature generation unit is configured to generate a token-level voiceprint feature of the target speech data based on the frame-level acoustic feature. The detection unit is configured to determine, a token in the target speech data where speaker change occurs, based on the token-level semantic feature and the token-level voiceprint feature.

In a third aspect of the present disclosure, there is provided an electronic device comprising: at least one processing unit; at least one memory coupled to the at least one processing unit and storing instructions for execution by the at least one processing unit which, when executed by the at least one processing unit, cause the device to perform the method according to the first aspect of the present disclosure.

In a fourth aspect of the present disclosure, there is provided a computer-readable storage medium comprising machine-executable instructions which, when executed by a device, cause the device to perform the method according to the first aspect of the present disclosure.

In a fifth aspect of the present disclosure, there is provided a computer program product comprising machine executable instructions that, when executed by a device, cause the device to perform the method according to the first aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

FIG. 3 illustrates a schematic flow diagram of a speech processing method according to embodiments of the present disclosure;

DETAILED DESCRIPTION OF EMBODIMENTS

Figure 1:
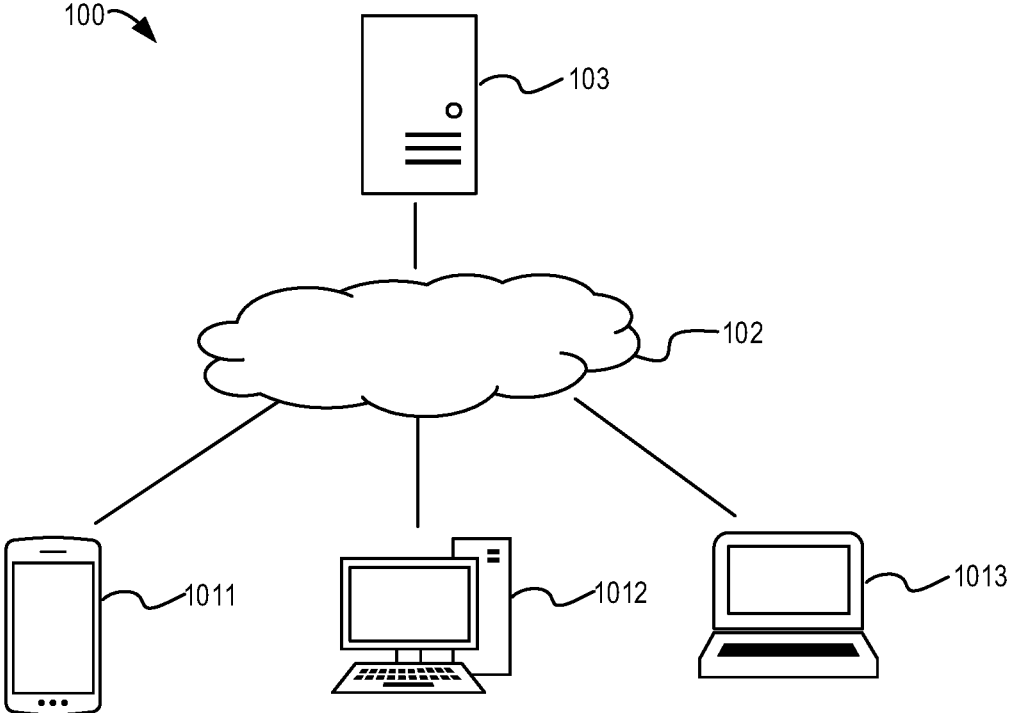
FIG. 1 illustrates a schematic diagram of an example environment in which embodiments of the present disclosure herein may be implemented.

It should be understood that prior to using the technical solutions disclosed in the various embodiments of the present disclosure, the user should be informed of the type, scope of use, use scenario, etc. of personal information involved in the present disclosure in an appropriate manner according to relevant laws and regulations and user's authority should be obtained.

For example, in response to receiving a user's active request, prompt information is sent to the user to explicitly prompt the user that the operation requested to be performed requires obtaining and using personal information of the user. Accordingly, the user may, according to prompt information, autonomously select whether to provide personal information to software or hardware, such as an electronic device, an application program, a server or a storage medium, which executes the operation of the technical solution of the present disclosure.

As an alternative but non-limiting implementation, in response to receiving an active request from the user, the prompt message may be sent to the user, for example, in the form of a pop-up window in which the prompt message may be presented in text. In addition, the pop-up window may also carry a selection control for the user to select "agree" or "disagree" to provide personal information to the electronic device.

It is to be understood that the above-described processes of notifying user and obtaining user authorization are merely illustrative and not limiting of implementations of the present disclosure, and that other ways of satisfying relevant laws and regulations may also be applied to implementations of the present disclosure.

Hereinafter, preferred embodiments of the present disclosure will be described in more detail with reference to the accompanying drawings. While the preferred embodiments of the disclosure have been illustrated in the drawings, it will be understood that the disclosure may be embodied in various forms and should not be construed as limited to the embodiments set forth herein. Rather, these embodiments are provided so that this disclosure will be thorough and complete, and will fully convey the scope of the disclosure to those skilled in the art.

As used herein, the term "include" and its variants are to be read as open-ended terms that mean "include, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "another embodiment" is to be read as "at least another embodiment." The terms "first", "second" and so on can refer to same or different objects. The following text also can include other explicit and implicit definitions.

It is noted that any numerical values or numbers used in the present disclosure are exemplary and are in no way intended to limit the scope of the present disclosure.

As mentioned above, the performance of the SCD system will greatly affect the subsequent task processing of speech processing. Some conventional methods use distance-based methods. Such methods partition long speech by a fixed length, and then calculate the distance between voiceprint features in adjacent segments. Once the distance exceeds a threshold, it is determined that speaker change occurs between two segments. However, with such methods, the detection accuracy is limited by the length of speech segments, and detection fails when the speakers convert quickly. There are also end-to-end methods that use neural network models to predict speaker change directly, instead of relying on distance metrics. However, with predicting speaker change at the speech frame level, such methods are complex due to relying heavily on labeling of speech data, and requiring late speech-to-text recognition processing.

In view of this, embodiments of the present disclosure provide a method of speech processing. With the method, frame-level acoustic features of the target speech data are converted into token-level semantic features of the target speech data. The frame-level acoustic features may have the form of a sequence of acoustic features, each of which corresponds to a speech frame in the speech data, while the token-level semantic features may be in the form of a sequence of semantic features, each of which corresponds to a token in the speech data. Herein, a plurality of speech frames may be aggregated together, corresponding to one token. In the method, token-level voiceprint features of the target speech data are also generated based on frame-level acoustic features. The token-level voiceprint features may be in the form of a sequence of voiceprint features, each of which corresponds to a token in the speech data. In the method, tokens in the target speech data where speaker change occurs are also determined based on token-level semantic features and token-level voiceprint features. According to embodiments of the present disclosure, speaker change in speech data is detected at the token level in conjunction with the speaker's acoustic features and speech content, and speaker-based speech recognition results can be output directly without post-processing, simplifying the speech recognition process.

Implementation details of embodiments of the present disclosure are described in detail below with reference to FIGS. 1-8.

FIG. 1 illustrates a schematic diagram of an example environment 100 in which various embodiments of the disclosure can be implemented. As shown in FIG. 1, a system architecture 100 may include terminal devices 1011, 1012, 1013, network 102, and a server 103. The network 102 serves as a medium for providing communication links between the terminal devices 1011, 1012, 1013 and the server 103. The network 102 may include a variety of connection types, such as wired, wireless communication links, or fiber optic cables.

The terminal devices 1011, 1012, 1013 may be hardware, software, or a combination of hardware and software. When the terminal devices 1011, 1012, 1013 are hardware, they may be electronic devices with computing capabilities, including but not limited to smartphones, tablets, laptops, portable computers, desktops, etc. When the terminal devices 1011, 1012, 1013 are software, they may be installed in the electronic devices listed above and may be implemented as multiple software or software modules (e.g., multiple software or software modules with speech processing or speech recognition capabilities) or as a single software or software module, and the present disclosure is not limited thereto.

The terminal devices 1011, 1012, 1013 may also obtain a speech processing model from the server 103. The terminal devices 1011, 1012, 1013 may collect voice data in real time via a microphone, receive voice data from other devices, or read stored voice data as target speech data, and then perform speech processing according to embodiments of the present disclosure for the target speech data.

Alternatively, the terminal devices 1011, 1012, 1013 may interact with the server 103 via the network 102 to send or receive data and the like, for example, the server 103 may receive real-time collected or pre-collected voice data sent by the terminal devices 1011, 1012, 1013, and the terminal devices 1011, 1012, 1013 may also receive speech processing results output by the server 103.

The server 103 may be hardware, software, or a combination thereof. When the server 103 is hardware, it may be implemented as a distributed server cluster of multiple servers or as a single server. When the server 103 is software, it may be implemented as multiple software or software modules (e.g., multiple software or software modules with speech processing or speech recognition capabilities) or as a single software or software module, and the present disclosure is not limited thereto.

The server 103 may be a server processing target speech data to be recognized received from the terminal devices 1011, 1012, 1013. The server 103 may receive target speech data from the terminal devices 1011, 1012, 1013, and then perform a speech processing procedure according to embodiments of the present disclosure for the target speech data. For example, the server 103 may output the speech processing result to the terminal devices 1011, 1012, 1013.

Note that in the case where the speech processing provided by the embodiments of the present disclosure is performed by the terminal devices 1011, 1012, 1013, the exemplary system architecture 100 may not comprise the network 102 and the server 103 if the terminal devices 1011, 1012, 1013 have pre-trained speech processing models stored locally. The speech processing model may be trained by the server 103 and distributed to the terminal devices 1011, 1012, 1013 or may be trained locally by any of the terminal devices 1011, 1012, 1013.

In addition, the number of terminal devices, network and servers in FIG. 1 is merely illustrative. There may be any number of terminal devices, network, and servers, depending on implementation requirements.

An exemplary environment in which embodiments of the present disclosure may be implemented is described above with reference to FIG. 1. It should be understood that FIG. 1 is merely illustrative and that the environment may include more modules or components, or omit some of the modules or components, or the modules or components shown may be recombined. Embodiments of the present disclosure may be practiced in environments different from those illustrated in FIG. 1, and the present disclosure is not limited thereto.

Figure 2:
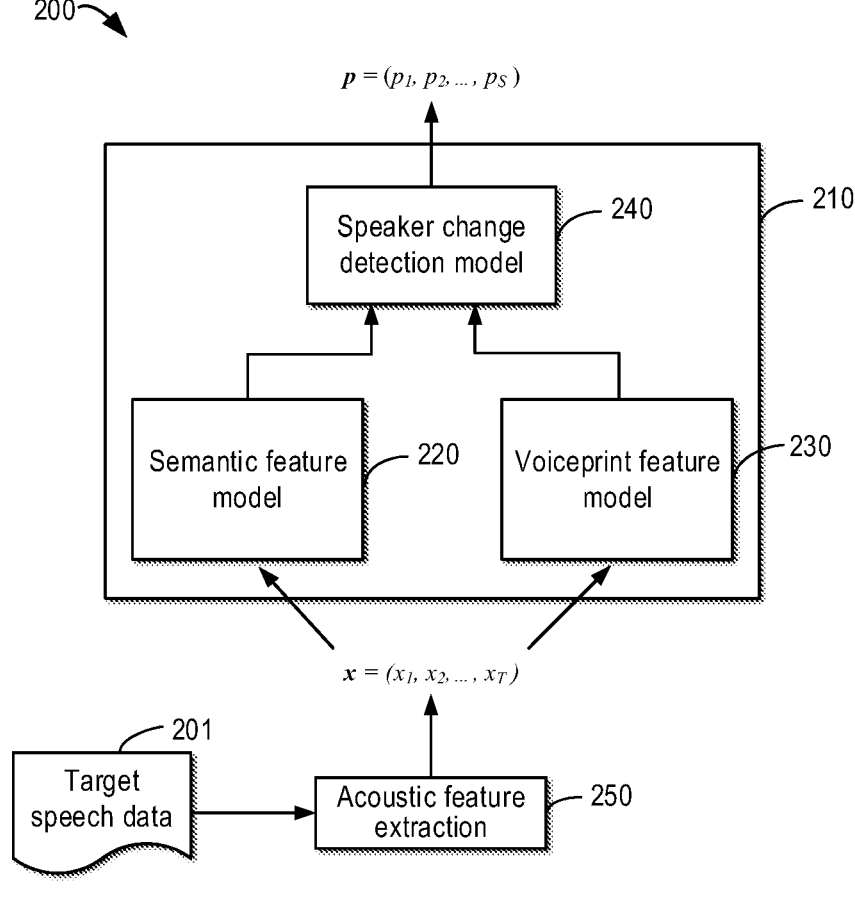
FIG. 2 illustrates a general schematic diagram of a process for Speaker Change Detect (SCD) in target speech data according to embodiments of the present disclosure.

FIG. 2 illustrates a general schematic diagram of a process for SCD in target speech data according to embodiments of the present disclosure.

Interactive speech data with multiple speakers using embodiments of the present disclosure for speaker change detection is referred to herein as target speech data. In addition, the present disclosure does not limit the language type of the target speech data, and the target speech data may be voice data in Chinese, in English or in other types. The present disclosure also does not limit the source of the target speech data, and the target speech data may be voice data collected in advance, voice data collected by a terminal device in real time, or voice data received via a network.

As shown in the figure, the process 200 of SCD involves a speech processing model 210 and an acoustic feature extraction model 250, both of which may be implemented or deployed at any of the terminal devices 1011, 1012, 1013, or the server 103 shown in FIG. 1.

The target speech data 201 is provided as input to the acoustic feature extraction unit 250. The acoustic feature extraction unit 250 may output frame-level acoustic feature $x=(x_1, x_2, \ldots, x_T)$ of the target speech data 201, where T is the number of speech frames and $x_i$ (i=1, 2, . . . T) is the acoustic feature of any one of the speech frames. Specifically, in extracting acoustic features of target speech data, the acoustic features may be extracted as follows. Firstly, the target speech data needs to be framed to obtain a corresponding speech frame sequence, and then the framed speech frame sequence is pre-emphasized, and then the acoustic features of each speech frame are extracted successively. The acoustic features include feature data for characterizing acoustic information of a corresponding speech frame, which may be, for example, a Filter Bank feature, a Mel scale Frequency Cepstral Coefficients (MFCC) feature, or a Perceptual Linear Predictive (PLP) feature, etc. The acoustic feature $x_i$ of each speech frame may be expressed in the form of a multidimensional vector, and thus the frame-level acoustic features x output from the acoustic feature extraction unit 230 may be expressed in the form of a sequence (e.g., a matrix) of acoustic features.

The frame-level acoustic feature x is provided to a speech processing model 210 according to embodiments of the present disclosure. The speech processing model 210 may be implemented as a neural network model, and trained for SCD of frame-level acoustic feature x, and output a token-level processing result $p=(p_1, p_2, \ldots, p_S)$, where S is the number of tokens and $p_i$ (i=1, 2, . . . S) is the detection result for any token in the target speech data. In this context, a token may include at least one of: a character, a word, a subword, a letter, a syllable or a phoneme. Multiple speech frames may be grouped together, corresponding to one token. By way of example and not limitation, the speech processing model 210 performs a token-level binary classification for the target speech data 201, and the detection result pi for each token may be, for example, "0" or "1", where "0" indicates that no speaker change has occurred at the current token and "1" indicates that speaker change has occurred from the current token. It should be noted that, as used herein, the speaker change includes a transition from one speaker to another speaker, a transition from one speaker to multiple speakers (i.e., speakers talk simultaneously), a transition from multiple speakers to one speaker, a transition from multiple speakers to different multiple speakers (at least one speaker being different), etc.

In general, the speech processing model 210 detects speaker changes using both voiceprint features (also referred to as speaker features or speaker representations) and speech content of a speaker. As shown in the figure, speech processing model 210 includes a semantic feature model 220, a voiceprint feature model 230, and a speaker change detection model 240. The speech feature model 220 receives a frame-level acoustic feature $x=(x_1, x_2, \ldots, x_T)$ as input and outputs a token-level semantic feature (not shown) of the target speech data 201. The voiceprint feature model 230 also receives a frame-level acoustic feature $x=(x_1, x_2, \ldots, x_T)$ as input and outputs a token-level voiceprint feature (not shown) of the target speech data 201. The token-level semantic features and token-level voiceprint features are finally provided to the speaker change detection model 240, which generates a detection result $p=(p_1, p_2, \ldots, p_S)$.

Next, a speech processing according to an embodiment of the present disclosure is described in detail with reference to FIGS. 3 to 6.

FIG. 3 illustrates a schematic flow diagram of a speech processing method according to embodiments of the present disclosure. The method 300 may be implemented, for example, by any of the terminal devices 1011, 1012, 1013 shown in FIG. 1 or by the server 103. In particular, the method 300 may be implemented by the speech processing model 210 shown in FIG. 2. It should be appreciated that method 300 may also include additional actions not shown and/or may omit the shown actions, and the scope of the present disclosure is not limited in this respect. The method

300 is described in detail below in conjunction with FIG. 2. For ease of explanation, reference is made to FIG. 2.

At block 310, token-level semantic features of the target speech data are generated based on frame-level acoustic features of the target speech data. The actions shown at block 310 may be implemented, for example, by the semantic feature model 220 in FIG. 2.

Figure 4:
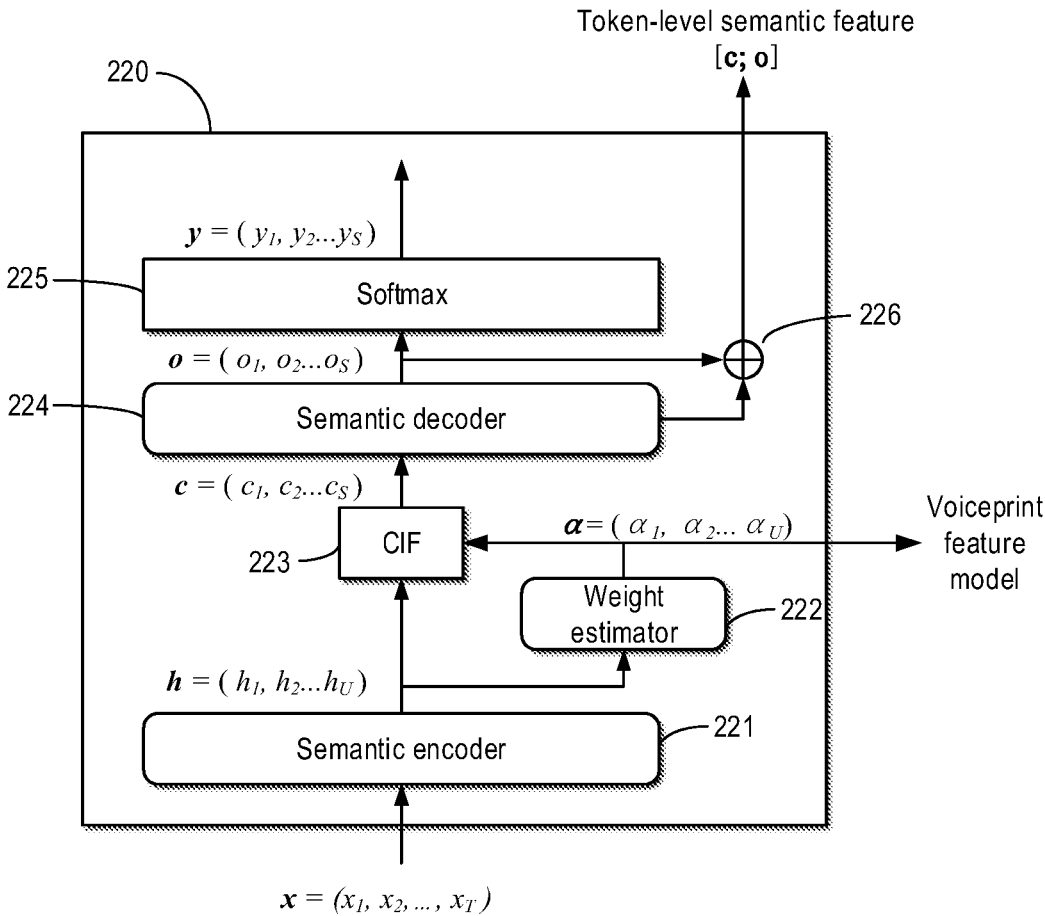
FIG. 4 illustrates a schematic diagram of a structure of a semantic feature model according to embodiments of the present disclosure.

FIG. 4 illustrates a schematic diagram of the structure of the semantic feature model 220 according to an embodiment of the present disclosure. Details of generating token-level semantic features will be described with reference to FIG. 4.

In FIG. 4, the semantic feature model 220 receives frame-level acoustic feature $x=(x_1, x_2, \ldots, x_T)$ from the acoustic feature extraction model 250. The frame-level acoustic feature $x=(x_1, x_2, \ldots, x_T)$ is provided to a semantic coder 221. The semantic coder 221 may be, for example, a Stacked-Conformer Encoder or other suitable structures that perform a high-dimensional extraction of the input frame-level acoustic feature x, resulting in a frame-level semantic encoded feature $h=(h_1, h_2, \ldots h_U)$, where U is the number of extracted speech frames and $h_i$ (i=1, 2, . . . U) is the semantic encoded feature for one speech frame. The frame-level semantic encoded feature h also has the form of a sequence of features.

The frame-level semantic encoded feature h is provided as input to a weight estimator 222. The weight estimator 222 may generate a set of weights $\alpha=(\alpha1, \alpha2 \ldots \alpha U)$ for the frame-level semantic encoded feature h, where each weight corresponds to a semantic encoded feature h, per frame in the frame-level semantic encoded feature h. In some embodiments, the weight estimator 222 may be implemented as a network model and may be trained to generate a different set of weights α for a different h. As an example, the weight estimator 222 may include a convolutional neural network (CNN) and a fully connected network. The weight estimator 222 may also include other neural networks with timing modeling capabilities, such as a recurrent neural network (RNN).

The weight α is provided to a Continuous Integrate-and-Fire (CIF) 223. The CIF 223 is used for integrating and issuing frame-level semantic encoded feature h accumulated per frame in the target speech data to determine token-level semantic encoded features in the target speech data that are bounded by tokens. With the CIF 223, a token-level semantic encoded feature $c=(c_1, c_2 \ldots c_S)$ may be generated based on a set of weights α and frame-level semantic encoded features h output by the weight estimator 222, wherein S represents the number of tokens and $c_i$ (i=1, 2, . . . S) is the semantic encoded feature for each token. The token-level semantic encoded features $c=(c_1, c_2 \ldots c_S)$ has the form of a sequence of features and may be further used to generate outputs of the semantic feature model 220.

In particular, the frame-level semantic encoded feature may be partitioned based on a comparison of an accumulated value of successive weight in the weight α with the threshold β. When the accumulated value is greater than a threshold value β, it is determined that there is a token boundary and the frame-level semantic encoded feature is partitioned here.

As an example, assuming α=(0.1, 0.5, 0.6, 0.3, 0.6, 0.5, 0.2, 0.1, 0.4, 0.5, 0.2, . . . ), β=1.0, the above weights correspond to frame-level semantic encoded features $h_i$ (i=1, 2, . . . ), respectively. It can be seen that the accumulated value of the first three weights (0.1+0.5+0.6=1.2) is larger than the threshold 1.0, so that the token boundary can be determined after the semantic encoded feature h3 of the third frame. Further, the portion of the weight accumulation value exceeding the threshold may be retained and used for boundary of the next token. For example, where the accumulated value of the first three weights 1.2 exceeds the threshold 1.0 by 0.2, 0.2 may be accumulated with the candidate weights, thereby determining the boundary of the second token. It can be seen that the accumulated value (0.2+0.3+0.6=1.1) of the 0.6=1.1) is greater than the threshold 1.0, so that after the semantic encoded feature $h_3$ of the fifth frame, a token boundary is determined, and so on. Thus, the frame-level semantic encoded feature h is partitioned into token-levels. As shown in FIG. 4, the weight α is also provided to the voiceprint feature model 230 for partitioning the frame-level voiceprint features, that is, the weight α is shared between the semantic feature model 220 and the voiceprint feature model 230. Specific details will be described with reference to FIG. 5.

With continuing reference to FIG. 4, the CIF 223 generates a token-level semantic encoded feature $c=(c_1, c_2 \ldots c_S)$ based on the partitioned frame-level semantic encoded feature $h=(h_1, h_2 \ldots h_U)$ and the weights $\alpha=(\alpha_1, \alpha_2 \ldots \alpha_U)$, wherein S is the number of tokens and $c_i$ is the semantic encoded feature for one token of the target speech data. In some embodiments, the frame-level semantic encoded feature h and the weights $\alpha=(\alpha_1, \alpha_2 \ldots \alpha_U)$ may be weighted and summed to obtain the token-level semantic encoded feature $c=(c_1, c_2 \ldots c_S)$. Continuing with the above example, $c_1=\alpha_1*h1+\alpha_2*h2+\alpha_3*h_3$, $c_2=\alpha_4*h4+\alpha_5*h_5$, . . . , and so on in a similar fashion. In some embodiments, the portion exceeding the threshold β may be passed to the next token, e.g., $c_2=(\alpha_1+\alpha_2+\alpha_3+\alpha_4-\beta)*h4+\alpha_5*h_5$, and so on in a similar fashion.

Token-level semantic encoded features $c=(c_1, c_2 \ldots c_S)$ may be provided to a semantic decoder 224. The semantic Decoder 224 may be, for example, a Stacked-Transformer decoder or other suitable structures. The semantic decoder 224 recursively decodes the token-level semantic encoded feature $c=(c_1, c_2 \ldots c_S)$ token by token, resulting in a token-level semantic decoded feature $o=(o_1, o_2 \ldots o_S)$. In some embodiments, a token-level semantic decoded feature $o=(o_1, o_2 \ldots o_S)$ and a token-level semantic encoded feature $c=(c_1, c_2 \ldots c_S)$ may be concatenated 226, thereby generating a token-level semantic feature [c; o]; as an output of the semantic feature model 220. The token-level semantic features [c; o] may have the form of a sequence of features.

As shown in FIG. 4, the token-level semantic decoded feature $o=(o_1, o_2 \ldots o_S)$ may be provided to a Softmax layer (e.g., a dense softmax or a fully connected layer), resulting in a speech-to-text recognition result $y=(y_1, y_2 \ldots y_S)$. Note that the recognition result $y=(y_1, y_2 \ldots y_S)$ does not participate in a process of generating the token-level semantic feature [c; o], but it is used in the training process to adjust the parameters of each model in the overall semantic feature model 220. In accordance with embodiments of the present disclosure, as a frame-level acoustic feature x is input to the semantic feature model 210, a speech-to-text recognition result $y=(y_1, y_2 \ldots y_S)$ and a token-level semantic feature [c; o] may be generated simultaneously. Thus, SCD and speech-to-text recognition may be achieved simultaneously without extra subsequent processing. It should be noted that the token-level semantic features output by semantic feature model 210 may also have other forms, such as token-level semantic decoded feature $o=(o_1, o_2 \ldots o_S)$, or token-level semantic encoded feature $c=(c_1, c_2 \ldots c_S)$, or any combination thereof.

Continuing with reference to FIG. 3, at block 320, token-level voiceprint features of the target speech data are generated based on the frame-level acoustic features. The actions shown at block 320 may be implemented by, for example, the semantic feature model 220 in FIG. 2.

Figure 5:
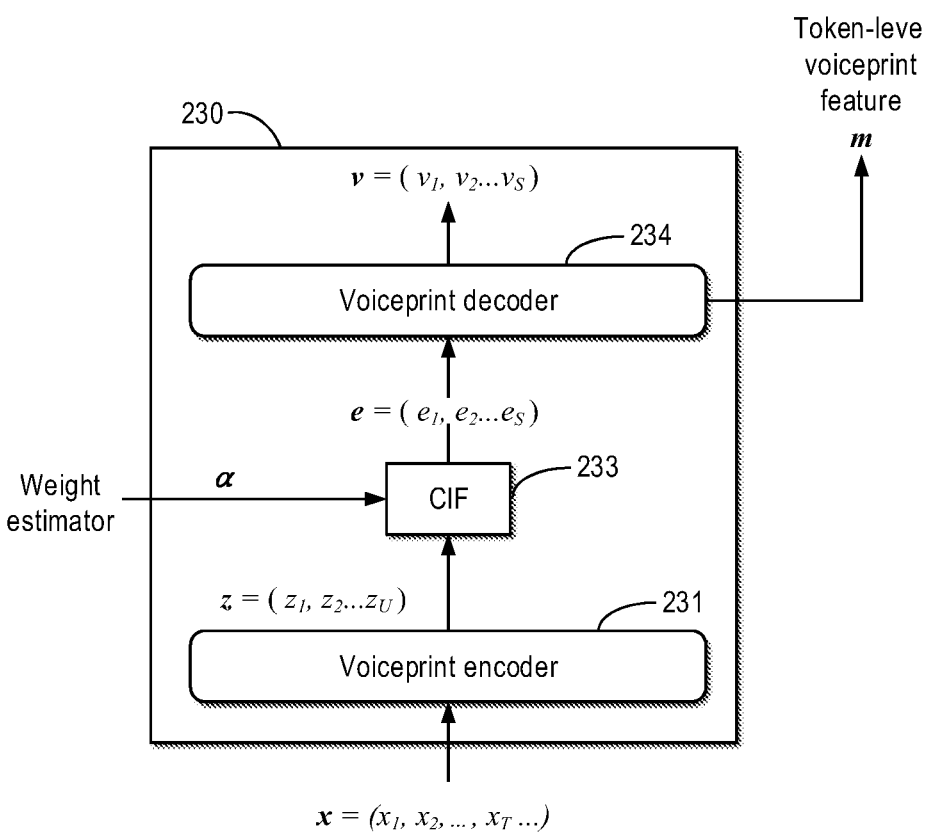
FIG. 5 illustrates a schematic diagram of a structure of a voiceprint feature model according to embodiments of the present disclosure.

FIG. 5 illustrates a schematic diagram of a structure of a voiceprint feature model 230 according to embodiments of the present disclosure. Details of generating token-level voiceprint features will be described with reference to FIG. 5.

As shown, the voiceprint feature model 230 receives frame-level acoustic features $x=(x_1, x_2, \ldots x_T)$ from the acoustic feature extraction model 250. The frame-level acoustic feature $(x_1, x_2, \ldots x_T)$ is provided to the voiceprint encoder 231. For example, the voiceprint encoder 231 may have a structure of ResNet 18 or another suitable structure, which performs a high-dimensional extraction of the input frame-level acoustic features x, resulting in frame-level voiceprint encoded features $\mathbf{z}=(z_1, z_2 \ldots z_U)$, wherein U is the number of extracted speech frames and $z_i$ (i=1, 2, . . . U) is the voiceprint encoded features for one speech frame. The frame-level voiceprint encoded feature $\mathbf{z}$ also has a form of a sequence of features, and corresponds to the frame-level semantic encoded feature h, with the same frame number U.

The frame-level voiceprint encoded feature $\mathbf{z}$ is provided to another CIF 233. The CIF 233 also receives a set of weights $\alpha$ from the weight estimator 222 of the semantic recognition model 220. As mentioned above, the voiceprint feature model 230 and the semantic feature model 220 share a set of weights $\alpha$. With the CIF 233, a token-level voiceprint feature may be generated based on a frame-level voiceprint encoded feature $\mathbf{z}=(z_1, z_2 \ldots z_U)$ and a set of weights $\alpha$. In particular, similar to the CIF 223 in the semantic feature model 220, the CIF 233 may partition frame-level voiceprint encoded features based on a comparison of an accumulated value of successive weight in a set of weights $\alpha$ with a threshold. Then, a token-level voiceprint feature $e=(e_1, e_2 \ldots e_S)$ is generated based on the partitioned frame-level voiceprint encoded feature $\mathbf{z}=(z_1, z_2 \ldots z_U)$ and the weight $\alpha$, where S denotes the number of tokens and each component $e_i$ (i=1, 2, . . . S) denotes a voiceprint encoded feature for one token. For example, this may be done by weighted summation, similar to the CIF 223 in the semantic feature model 220, and this will not be described in detail herein. Thus, a conversion of the frame-level voiceprint representation $\mathbf{z}$ to the token-level voiceprint feature e is completed. In this manner, sharing the weights from the semantic feature model 220 ensures that the length of the output e sequence is exactly the same as the length of c, and that the features in each sequence correspond to each other, each corresponding to a token in the target speech data.

The token-level voiceprint features $e=(e_1, e_2 \ldots e_S)$ are then provided to a voiceprint decoder 234. The voiceprint decoder 234 may be implemented as a fully connected structure for voiceprint decoded each token-level voiceprint feature in a token-level voiceprint feature $e=(e_1, e_2 \ldots e_S)$, resulting in a classification result $v=(v_1, v_2 \ldots v_S)$, wherein each component $v_i$ (i=1, 2, . . . S) represents a probability of speaker classification for one token. In some embodiments, the hidden layer output m in the voiceprint decoder 234 may be retained for use as a token-level voiceprint feature provided for use by the speaker change detection model 240. Token-level voiceprint features may be in the form of a sequence of features. Note that the classification result $v=(v_1, v_2 \ldots v_S)$ does not participate in the process of generating the token-level voiceprint features m, but it is used in the training process for adjusting the parameters of the individual models in the overall speech processing model 210.

With continued reference to FIG. 3, at block 330, the tokens in the target speech data where speaker change occurs are determined based on the token-level semantic features and the token-level voiceprint features. The actions shown at block 330 may be implemented, for example, by speaker change detection model 240 in FIG. 2.

Figure 6:
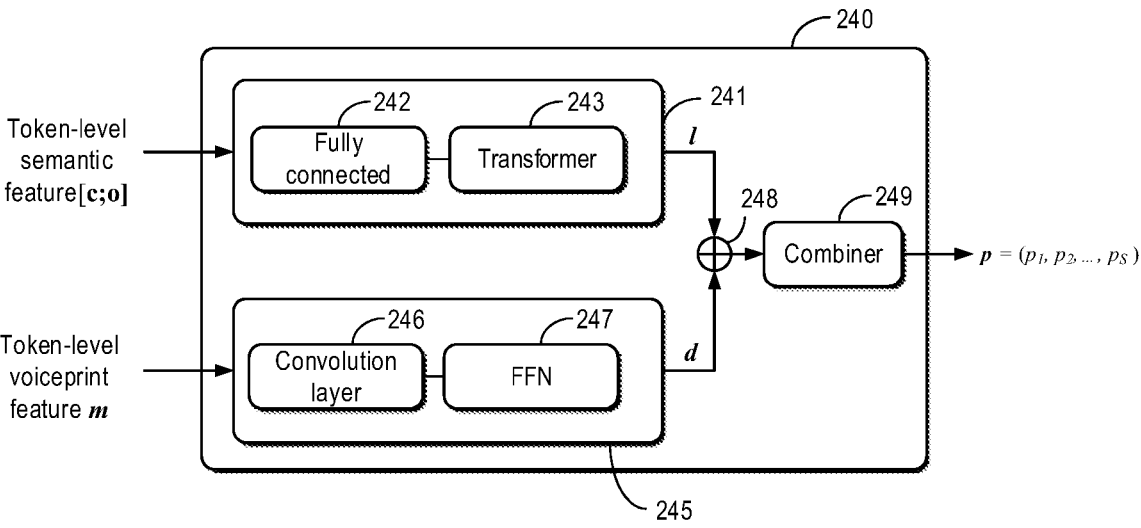
FIG. 6 illustrates a schematic diagram of a structure of a speaker change detection model according to embodiments of the present disclosure.

FIG. 6 illustrates a schematic diagram of a structure of a speaker change detection model 240 according to embodiments of the present disclosure. Details of the token for which SCD occurs will be described with reference to FIG. 6.

As shown, the speaker change detection model 240 includes a speech content extraction model 241 for receiving and processing token-level speech feature [c; o]. The speech content extraction model 241 includes a fully connected structure 242 and a Transformer structure 243. A speech content representation l of the target speech data 201 is obtained after processing token-level speech features [c; o]. The speech content representation l is a token-level sequence of features.

The speaker change detection model 240 also includes a voiceprint difference extraction model 245 for receiving and processing token-level acoustic feature m. The voiceprint difference extraction model 245 includes a convolution layer 246 and a feedforward network (FFN) 247 connected in series. The voiceprint difference extraction model 245 is used to capture the amount of difference d between a voiceprint feature at each token level and adjacent voiceprint features. Depending on the size of a convolution kernel of the convolution layer 246, "adjacent" is meant to include closely adjacent and spaced apart distance (e.g., one, two or more token positions apart).

The voiceprint difference representation d of the voiceprint features and the speech content representation l may then be concatenated 248 and provided to a combiner 249. The combiner 249 may employ a fully connected structure or any other suitable structure to provide a binary classification detection result for each token in a token-level representation [l; d] concatenated. The combiner 249 may output a token-level prediction result $p=(p_1, p_2, \ldots p_S)$, where S is the number of tokens in the target speech data and $p_i$ (i=1, 2, . . . S) is a detection result for any one token in the target speech data.

The structure of the speech processing model 210 and the corresponding process 300 of speech processing according to embodiments of the present disclosure has been described. After being trained, the speech processing model 210 may receive the target speech data 201 and implement the process 300. Embodiments of the present disclosure also provide exemplary methods for training the speech processing model 210.

In some embodiments, the training for the speech processing model 210 may be performed in two stages. In the first stage, the parameters of semantic feature model 220 and voiceprint feature model 230 are separately pre-trained. In the second stage, the semantic feature model 220 and the voiceprint feature model 230 pre-load the parameters obtained in the first stage, and then randomly initialize the parameters of the speaker change detection model 240, and fix the parameters of the ASR part to jointly optimize the parameters of the voiceprint feature model 230 and the speaker change detection model 240.

A speech processing method or process according to an embodiment of the present disclosure is described above with reference to FIGS. 1-6. Compared to existing schemes, according to embodiments of the present disclosure, speaker change in speech data is detected at the token level in conjunction with the speaker's acoustic features and speech content, and speaker-based speech recognition results may be output directly without post-processing, simplifying the speech recognition process. In some embodiments, frame-level acoustic features are integrated into token-level seman- tic features carrying speech content and voiceprint features carrying speaker information, respectively, and the voice- print features and acoustic features are aligned with each other so that speaker changes may be detected with both speaker features and speech contents by a simpler model structure. On the other hand, the speaker change detection process and the speech recognition process may be per- formed at the same time, thereby simplifying the process of collating the speech recognition results at a later stage.

Figure 7:
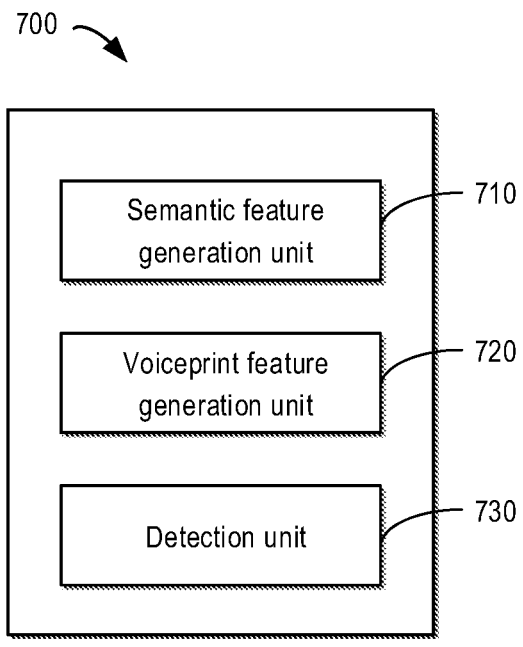
FIG. 7 illustrates a schematic block diagram of a speech processing apparatus according to embodiments of the present disclosure.

FIG. 7 illustrates a schematic block diagram of a speech processing apparatus 700 according to an embodiment of the present disclosure The apparatus 700 may be implemented at any of the terminal devices 1011, 1012, 1013 or the server 103 shown in FIG. 1.

As shown, the apparatus 700 includes a semantic feature generation unit 710, a voiceprint feature generation unit 720, and a detection unit 730. The semantic feature generation unit 710 is configured to generate a token-level semantic feature of the target speech data based on a frame-level acoustic feature of target speech data. The voiceprint feature generation unit 720 is configured to generate a token-level voiceprint feature of the target speech data based on the frame-level acoustic feature. The detection unit 730 is configured to determine a token in the target speech data where speaker change occurs based on the token-level semantic feature and the token-level voiceprint feature.

In some embodiments, the semantic feature generation unit 710 may also be configured to: perform semantic encoding of the frame-level acoustic feature to obtain a frame-level semantic encoding feature; generate a set of weights based on the frame-level semantic encoded feature, wherein a weight in the set corresponds to a semantic encoded feature per frame in the frame-level semantic encoded feature; and generate the token-level semantic feature based on the set of weights and the frame-level semantic encoded feature.

In some embodiments, semantic feature generation unit 710 may also be configured to: partition the frame-level semantic encoded feature based on a comparison of an accumulated value of successive weights in the set of weights with a threshold; and generate the token-level semantic feature based on the partitioned frame-level semantic encoded feature and the set of weights.

In some embodiments, semantic feature generation unit 710 may also be configured to: generate a token-level semantic encoded feature of target speech data based on the partitioned frame-level semantic encoded feature and the set of weights; and generate the token-level semantic feature based on the token-level semantic encoded feature.

In some embodiments, semantic feature generation unit 710 may also be configured to: obtain a token-level semantic decoded feature by performing semantic decoding on the token-level semantic encoded feature; and generate the token-level semantic feature by concatenating the token-level semantic decoded feature and the token-level semantic encoded feature.

In some embodiments, the voiceprint feature generation unit 720 may also be configured to: obtain a frame-level voiceprint encoded feature by performing voiceprint encod- ing of the frame-level acoustic feature; and generate the token-level voiceprint feature based on the frame-level voiceprint encoded feature and the set of weights.

In some embodiments, the voiceprint feature generation unit 720 may also be configured to: partition the frame-level semantic encoded feature based on a comparison of an accumulated value of successive weights in the set of weights with a threshold; and generate a token-level seman- tic feature based on a partitioned frame-level semantic encoded feature and the set of weights; and obtain the token-level voiceprint feature by performing voiceprint decoding of the token-level voiceprint encoded feature.

In some embodiments, the detection unit 730 may also be configured to: generate a speech content representation of the target voice data based on the token-level semantic feature; generate a differential representation of speaker voiceprint of the target speech data based on the token-level voiceprint feature; and determine a token in the target speech data where speaker change occurs based on the speech content representation and the differential representation of speaker voiceprint.

In some embodiments, the token of the target speech data comprises at least one of: a character, a word, a subword, a letter, a syllable or a phoneme.

Figure 8:
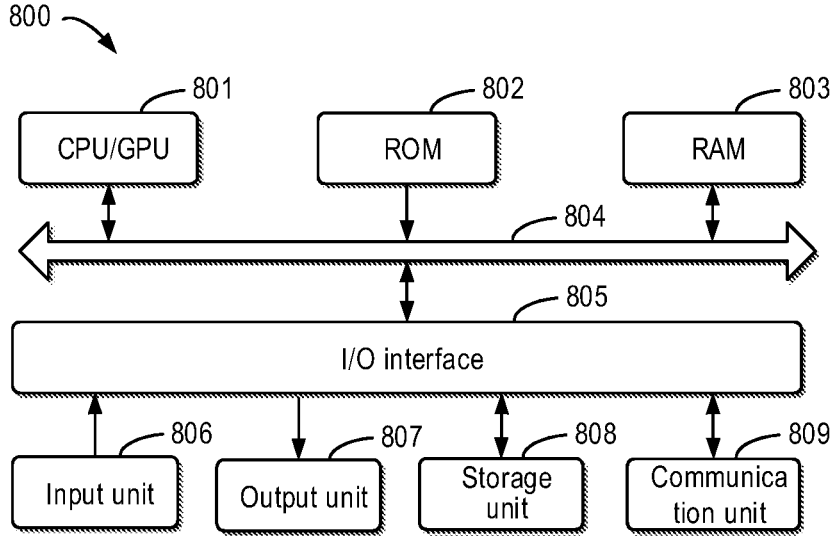
FIG. 8 illustrates a schematic block diagram of an example device that may be used to implement embodiments of the present disclosure.

FIG. 8 illustrates a schematic block diagram of an example device 800 that may be used to implement embodi- ments of the present disclosure. For example, terminal devices 1011, 1012, 1013 or server 103 according to embodiments of the present disclosure may be implemented by device 800. As shown, device 800 includes a central processing unit (CPU) or graphics processing unit (GPU) 801 that may perform various suitable actions and processes in accordance with computer program instructions stored in read only memory (ROM) 802 or loaded from storage unit 808 into random access memory (RAM) 803. In the RAM 803, various programs and data required for the operation of the device 800 can also be stored. CPU/GPU 801, ROM 802, and RAM 803 are connected to each other via bus 804. An input/output (I/O) interface 805 is also coupled to bus 804.

A plurality of components in the device 800 is connected to the I/O interface 805, including: an input unit 806, such as keyboard, mouse and the like; an output unit 807, e.g., various kinds of display and loudspeakers etc.; a storage unit 808, such as magnetic disk and optical disk etc.; and a communication unit 809, such as network card, modem, wireless transceiver and the like. The communication unit 809 allows the device 800 to exchange information/data with other devices via the computer network, such as Internet, and/or various telecommunication networks.

Each of the processes, processes, models, or means described above may be executed or implemented by CPU/ GPU 801. For example, in some embodiments, the method 300 can be implemented as a computer software program tangibly included in the machine-readable medium, e.g., storage unit 808. In some embodiments, the computer pro- gram can be partially or fully loaded and/or mounted to the device 800 via ROM 802 and/or communication unit 809. When the computer program is loaded into RAM 803 and executed by CPU/GPU 801, one or more of the acts of method 300 described above may be performed to imple- ment any one or more of speech processing model 210, semantic feature model 220, voiceprint feature 230 model, speaker change detection model 240, acoustic feature extraction model 250 shown in FIG. 2, FIGS. 4-6, or to implement apparatus 700 shown in FIG. 7.

The present disclosure can be method, apparatus, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some embodiments, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow chart and/or block diagram of method, apparatus (system) and computer program products according to embodiments of the present disclosure. It should be understood that each block of the flow chart and/or block diagram and the combination of various blocks in the flow chart and/or block diagram can be implemented by computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by system, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only exemplary rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each embodiment, or enable other ordinary skilled in the art to understand implementations of the present disclosure.

We claim:

1. A method of speech processing, comprising:
generating a token-level semantic feature sequence of target speech data based on a frame-level acoustic feature of the target speech data, a semantic feature of the token-level semantic feature sequence corresponding to a token of the target speech data;
generating a token-level voiceprint feature sequence of the target speech data based on the frame-level acoustic feature, a voiceprint feature of the token-level voiceprint feature sequence corresponding to a token of the target speech data, comprising:
generating the token-level voiceprint feature based on a frame-level voiceprint encoded feature and a set of weights, comprising:
partitioning the frame-level voiceprint encoded feature based on a comparison of an accumulated value of successive weights in the set of weights with a threshold; and
generating a token-level voiceprint encoded feature based on the partitioned frame-level voiceprint encoded feature and the set of weights;
obtaining the token-level voiceprint feature by performing voiceprint decoding of the token-level voiceprint encoded feature; and
determining a token in the target speech data where a speaker change occurs based on the token-level semantic feature sequence and the token-level voiceprint feature sequence.

2. The method of claim 1, wherein generating a token-level semantic feature sequence of target speech data based on a frame-level acoustic feature of the target speech data further comprises:
performing semantic encoding of the frame-level acoustic feature to obtain the frame-level semantic encoded feature;
generating the set of weights based on the frame-level semantic encoded feature, wherein a weight in the set corresponds to a semantic encoded feature per frame in the frame-level semantic encoded feature; and
generating the token-level semantic feature sequence based on the set of weights and the frame-level semantic encoded feature.

3. The method of claim 2, wherein generating the token-level semantic feature based on the set of weights and the frame-level semantic encoded feature comprises:
partitioning the frame-level semantic encoded feature based on a comparison of an accumulated value of successive weights in the set of weights with a threshold; and
generating the token-level semantic feature sequence based on the partitioned frame-level semantic encoded feature and the set of weights.

4. The method of claim 3, wherein generating the token-level semantic feature sequence based on the partitioned frame-level semantic encoded feature and the set of weights comprises:
generating a token-level semantic encoded feature of target speech data based on the partitioned frame-level semantic encoded feature and the set of weights; and
generating the token-level semantic feature sequence based on the token-level semantic encoded feature.

5. The method of claim 4, wherein generating the token-level semantic feature sequence based on the token-level semantic encoded feature comprises:

obtaining a token-level semantic decoded feature by performing semantic decoding of the token-level semantic encoded feature; and
generating the token-level semantic feature sequence by concatenating the token-level semantic decoded feature and the token-level semantic encoded feature.

6. The method of claim 2, wherein generating the token-level voiceprint feature of the target speech data based on the frame-level acoustic feature further comprises:
obtaining the frame-level voiceprint encoded feature by performing voiceprint encoding of the frame-level acoustic feature.

7. The method of claim 1, wherein determining a token in the target speech data where a speaker change occurs based on the token-level semantic feature sequence and the token-level voiceprint feature sequence comprises:
generating a speech content representation of the target voice data based on the token-level semantic feature sequence;
generating a differential representation of speaker voiceprint of the target speech data based on the token-level voiceprint feature sequence; and
determining a token in the target speech data where a speaker change occurs based on the speech content representation and the differential representation of speaker voiceprint.

8. The method of claim 5, wherein the token of the target speech data comprises at least one of: a character, a word, a subword, a letter, a syllable or a phoneme.

9. An electronic device comprising:
at least one processing unit;
at least one memory coupled to the at least one processing unit and storing instructions for execution by the at least one processing unit which, the instructions, when executed by the at least one processing unit, cause the device to perform acts comprising:
generating a token-level semantic feature sequence of target speech data based on a frame-level acoustic feature of the target speech data, a semantic feature of the token-level semantic feature sequence corresponding to a token of the target speech data;
generating a token-level voiceprint feature sequence of the target speech data based on the frame-level acoustic feature, a voiceprint feature of the token-level voiceprint feature sequence corresponding to a token of the target speech data, comprising:
generating the token-level voiceprint feature based on a frame-level voiceprint encoded feature and a set of weights, comprising:
partitioning the frame-level voiceprint encoded feature based on a comparison of an accumulated value of successive weights in the set of weights with a threshold; and
generating a token-level voiceprint encoded feature based on the partitioned frame-level voiceprint encoded feature and the set of weights;
obtaining the token-level voiceprint feature by performing voiceprint decoding of the token-level voiceprint encoded feature; and
determining a token in the target speech data where a speaker change occurs based on the token-level semantic feature sequence and the token-level voiceprint feature sequence.

10. The device of claim 9, wherein generating a token-level semantic feature sequence of target speech data based on a frame-level acoustic feature of the target speech data further comprises:

performing semantic encoding of the frame-level acoustic feature to obtain the frame-level semantic encoded feature;

generating the set of weights based on the frame-level semantic encoded feature, wherein a weight in the set corresponds to a semantic encoded feature per frame in the frame-level semantic encoded feature; and generating the token-level semantic feature sequence based on the set of weights and the frame-level semantic encoded feature.

11. The device of claim 10, wherein generating the token-level semantic feature based on the set of weights and the frame-level semantic encoded feature comprises:

partitioning the frame-level semantic encoded feature based on a comparison of an accumulated value of successive weights in the set of weights with a threshold; and generating the token-level semantic feature sequence based on the partitioned frame-level semantic encoded feature and the set of weights.

12. The device of claim 11, wherein generating the token-level semantic feature sequence based on the partitioned frame-level semantic encoded feature and the set of weights comprises:

generating a token-level semantic encoded feature of target speech data based on the partitioned frame-level semantic encoded feature and the set of weights; and generating the token-level semantic feature sequence based on the token-level semantic encoded feature.

13. The device of claim 12, wherein generating the token-level semantic feature sequence based on the token-level semantic encoded feature comprises:

obtaining a token-level semantic decoded feature by performing semantic decoding of the token-level semantic encoded feature; and generating the token-level semantic feature sequence by concatenating the token-level semantic decoded feature and the token-level semantic encoded feature.

14. The device of claim 10, wherein generating the token-level voiceprint feature of the target speech data based on the frame-level acoustic feature further comprises:

obtaining frame-level voiceprint encoded feature by performing voiceprint encoding of the frame-level acoustic feature.

15. The device of claim 9, wherein determining a token in the target speech data where a speaker change occurs based on the token-level semantic feature sequence and the token-level voiceprint feature sequence comprises:

generating a speech content representation of the target voice data based on the token-level semantic feature sequence;

generating a differential representation of speaker voiceprint of the target speech data based on the token-level voiceprint feature sequence; and determining a token in the target speech data where a speaker change occurs based on the speech content representation and the differential representation of speaker voiceprint.

16. The device of claim 13, wherein the token of the target speech data comprises at least one of: a character, a word, a subword, a letter, a syllable or a phoneme.

17. A computer program product having a non-transitory computer readable medium which stores a set of instructions to perform data access; the set of instructions, when carried out by computerized circuitry, causing the computerized circuitry to perform a method of:

generating a token-level semantic feature sequence of target speech data based on a frame-level acoustic feature of the target speech data, a semantic feature of the token-level semantic feature sequence corresponding to a token of the target speech data;

generating a token-level voiceprint feature sequence of the target speech data based on the frame-level acoustic feature, a voiceprint feature of the token-level voiceprint feature sequence corresponding to a token of the target speech data, comprising:

generating the token-level voiceprint feature based on a frame-level voiceprint encoded feature and a set of weights, comprising:

partitioning the frame-level voiceprint encoded feature based on a comparison of an accumulated value of successive weights in the set of weights with a threshold; and generating a token-level voiceprint encoded feature based on the partitioned frame-level voiceprint encoded feature and the set of weights;

obtaining the token-level voiceprint feature by performing voiceprint decoding of the token-level voiceprint encoded feature; and determining a token in the target speech data where a speaker change occurs based on the token-level semantic feature sequence and the token-level voiceprint feature sequence.

18. The computer program product of claim 17, wherein generating a token-level semantic feature sequence of target speech data based on a frame-level acoustic feature of the target speech data further comprises:

performing semantic encoding of the frame-level acoustic feature to obtain the frame-level semantic encoded feature;

generating the set of weights based on the frame-level semantic encoded feature, wherein a weight in the set corresponds to a semantic encoded feature per frame in the frame-level semantic encoded feature; and generating the token-level semantic feature sequence based on the set of weights and the frame-level semantic encoded feature.

* * * * *